(12) United States Patent
Hook

(10) Patent No.: US 8,191,429 B2
(45) Date of Patent: Jun. 5, 2012

(54) COMPOSITE FIBRE AND RELATED DETECTION SYSTEM

(75) Inventor: Patrick Hook, Devon (GB)

(73) Assignee: Auxetix Limited, Witheridge, Devon (GB)

(*) Notice: Subject to any disclaimer, the term of this patent is extended or adjusted under 35 U.S.C. 154(b) by 303 days.

(21) Appl. No.: 12/298,858

(22) PCT Filed: Apr. 30, 2007

(86) PCT No.: PCT/GB2007/001579
§ 371 (c)(1),
(2), (4) Date: Oct. 28, 2008

(87) PCT Pub. No.: WO2007/125352
PCT Pub. Date: Nov. 8, 2007

(65) Prior Publication Data
US 2009/0193906 A1    Aug. 6, 2009

(30) Foreign Application Priority Data

Apr. 28, 2006 (GB) .................................. 0608462.8

(51) Int. Cl.
*G01L 1/24* (2006.01)
(52) U.S. Cl. ........................................................ 73/800
(58) Field of Classification Search ...................... 73/800
See application file for complete search history.

(56) References Cited

U.S. PATENT DOCUMENTS

| 2,687,673 | A |   | 8/1954 | Boone |
| 3,508,589 | A |   | 4/1970 | Burton et al. |
| 3,651,195 | A | * | 3/1972 | Rasmussen ............... 264/172.17 |
| 4,365,865 | A | * | 12/1982 | Stiles ............................ 385/101 |
| 4,697,407 | A |   | 10/1987 | Wasserman |
| 4,788,868 | A | * | 12/1988 | Wilk ................................ 73/760 |
| 4,996,884 | A | * | 3/1991 | Lessing ........................... 73/800 |
| 5,568,964 | A | * | 10/1996 | Parker et al. .................... 362/556 |
| 5,806,295 | A | * | 9/1998 | Robins et al. .................... 57/220 |
| 5,926,584 | A | * | 7/1999 | Motzko et al. .................. 385/13 |
| 7,247,265 | B2 | * | 7/2007 | Alderson et al. ............. 264/125 |
| 7,252,870 | B2 | * | 8/2007 | Anderson et al. ............ 428/152 |
| 2005/0155336 | A1 |   | 7/2005 | Robins |
| 2005/0282009 | A1 | * | 12/2005 | Nusko et al. .................. 428/375 |
| 2007/0031667 | A1 | * | 2/2007 | Hook et al. .................... 428/373 |

FOREIGN PATENT DOCUMENTS

JP        09 302508        11/1997

* cited by examiner

*Primary Examiner* — Lisa Caputo
*Assistant Examiner* — Octavia Davis-Hollington
(74) *Attorney, Agent, or Firm* — King & Schickli, PLLC

(57) ABSTRACT

A composite fibre including at least a first component and a second component, wherein at least one of the components is an optical fiber, and the components are intertwined. The first component may be wound around the second component, and optionally the second component is wound around the first component. Associated fibrous assemblies, composite materials, fabrics, detection systems, items of clothing and methods of detecting a physical variable are also disclosed.

14 Claims, 4 Drawing Sheets

COMPOSITE FIBRE AND RELATED DETECTION SYSTEM

FIELD OF THE INVENTION

This invention relates to detection systems incorporating optical fibres, to components of the detection system, and to assemblies and structures incorporating these components.

BACKGROUND OF THE INVENTION

There is an ongoing need in various areas of industry for a sensor system that can be incorporated into a structure in order to measure forces that the structure is subjected to and, ideally, to determine any changes to the structure caused by the application of such forces. It is known to utilise longitudinally arranged optical fibres as strain sensors. When the optical fibres are subjected to strain, the light transmission through them varies, and this variation in light transmission is measured in order to determine the degree of strain. A problem associated with such optical fibre sensors is that the variation in the transmitted light is very small, and thus extremely sensitive detection equipment is required in order to extract meaningful data.

SUMMARY OF THE INVENTION

The present invention, in at least some of its embodiments, addresses the above described problems and desires.

According to a first aspect of the invention there is provided a composite fibre including at least a first and a second component, wherein at least one of the components is an optical fibre, and the components are intertwined.

It has been found that, highly advantageously, the incorporation of an optical fibre in a composite fibre of this type can result in an amplification of the variation of light transmission observed when the composite fibre is subjected to various perturbations, such as applied strain, lateral compression, torque or bending forces. Additionally, composite fibres of the invention can be incorporated conveniently into a variety of locations and materials. For the avoidance of doubt, the term "intertwined" includes within its scope wound, twisted and interlaced configurations. Without wishing to be limited by any particular theory, it is believed that relatively large variations in light transmission are caused by changes in path length and angle associated with perturbed composite fibres of the invention. The composite fibre defines a pathway, and it is believed (again without wishing to be limited by any particular theory) that the application of a force, such as a strain, compression or torsional force, to the composite fibre causes a displacement of the optical fibre away from or towards the pathway adopted by the composite fibre. Advantageously, the moduli of elasticity of the first and second components are sufficiently different to enable such "off-axis" displacement of the optical fibre away from or towards the pathway adopted by the composite fibre to occur.

Preferably, the modulus of elasticity of the first component is greater than the modulus of elasticity of the second component.

The first component and the second component may extend generally longitudinally relative to an axis, and variation in a tensile or compressive load applied to the first component causes the radial position of the second component relative to the axis to vary. However, it should be noted that the composite fibre may adopt a non-linear confirmation and/or forces other than tensile or compressive forces might be applied thereto.

Preferably, the first component is wound around the second component, and optionally the second component is wound around the first component. Typically, wound components are helically wound around the other component. However, other forms of intertwining might be envisaged, such as knitted fibres. It is possible for the first component to be wound around or otherwise intertwined with the second component and one or more further components. Similarly, it is possible for the second component to be wound around or otherwise intertwined with the first component and one or more further components. For example, the optical fibre may intertwine with two components in a zigzag conformation. The intertwining may take the form of looping the optical fibre around one of the two components, passing the optical fibre across to the second of the two components, looping the optical fibre around the second of the two components, and passing the optical fibre back across to the first of the two components, the process being repeated a desired number of times.

In the instance in which the first component is helically wound around the second component, the resultant fibre may be an auxetic fibre that displays auxetic properties. Auxetic materials are materials that have a negative or effectively negative Poisson's ratio. In contrast to most conventional materials, auxetic materials possess the property that under a tensile load the material expands perpendicularly to the axis along which the tensile load is applied. In other words, auxetic materials expand as they are stretched. Conversely, materials are also auxetic if a compressive load applied along an axis results in a reduction in the dimension of the material along an axis perpendicular to the axis along which the compressive load is applied. Most materials exhibit a positive Poisson's ratio, this ratio being defined by the ratio of the contractile transverse strain relative to the tensile longitudinal strain. Auxetic fibres are described in International publications WO 2006/021763, WO 2004/088015, and WO 00/53830, the contents of all of which are herein incorporated by reference. There is no previous suggestion in the field of auxetic materials to utilise optical fibres.

The first component may be an optical fibre,

The second component may be an elastomeric or non-elastomeric foam.

Alternatively the second component may be an optical fibre. It is possible that both first and second components might be optical fibres if optical fibres having suitable mechanical properties, in particular suitable moduli of elasticity are used.

The radius of the second component may exceed that of the first component, and may exceed the radius of the first component by a factor of at least 10, preferably at least 100.

A wound composite fibre may include, in addition to the first component, one or more further components which are wound around the second component. One or more of the further components may be a further optical fibre.

A wound composite fibre may be counter-wound, i.e. one component may be wound along the other component with one handedness (e.g. in a clockwise manner), and counter-wound back along the other component with the other handedness (e.g. in an anti-clockwise manner).

The optical fibre may be a fibre Bragg grating. The term 'fibre Bragg grating' is well known in the art of fibre optics, and is used herein to denote an optical fibre having one or more Bragg diffraction gratings formed therein. The Bragg grating(s) is formed by a variation in the effective refractive index of the core of the optical fibre, and may be periodic or aperiodic. The fibre Bragg grating may be a chirped fibre Bragg grating, i.e. a fibre Bragg grating in which the Bragg wavelength varies with position along the optical fibre.

The optical fibre may be a polymer optical fibre or a silica optical fibre. Other materials or combinations of materials might be used.

Composite fibres of the invention have many applications, some of which are described below. For example, fibres might be used in the construction of toys and games wherein physical events may trigger other events. For example, a physical strike may be detected using the composite fibre, and the detection of the strike may trigger a sound, a points score, a light signal or other display, or some other event.

According to a second aspect of the invention there is provided a fibrous assembly including at least two composite fibres wherein each of said composite fibres includes at least a first and a second component, wherein at least one of the components is an optical fibre, and the components are intertwined.

The at least two composite wound fibres may incorporate any aspect of the first aspect of the invention.

In one preferred embodiment, the fibrous assembly consists essentially of a pair of the composite fibres disposed alongside one another.

In another preferred embodiment, the fibrous assembly includes three or more composite fibres arranged alongside each other so as to form a sheet-like assembly.

In yet another preferred embodiment, the fibrous assembly includes a bundle or three or more composite fibres which extend in a common direction. Advantageously, each of the wound fibres in the bundle is disposed alongside at least two of the other composite fibres.

The first components of adjacent composite fibres may be wrapped around their respective second components with opposite handidness.

The fibrous assembly may further include one or more core components disposed so as to separate two or more composite fibres. For example, a fibrous assembly consisting essentially of a pair of composite fibres disposed alongside one another may further comprise a core component separating said pair of composite fibres. In another example, a bundle of three or more composite is arranged peripherally around a core component.

According to a third aspect of the invention there is provided a composite material having embedded therein at least one composite fibre of the first aspect of the invention and/or at least one fibrous assembly of the second aspect of the invention.

In a preferred embodiment, the composite fibres and/or fibrous assemblies are incorporated into a fibrous structure, a resin is added to the fibrous structure, and the resin is cured to produce a composite material. The fibrous structure may comprise carbon fibre or other high strength fibres, and may be in the form of a mat. Composite structures of the invention can be used in a variety of applications, such as aircraft bodies and wings, toys and games.

According to a fourth aspect of the invention there is provided a fabric including at least one composite fibre of the first aspect of the invention and/or at least one fibrous assembly of the second aspect of the invention. Preferably, the composite fibre and/or fibrous assembly forms part of the integrated structure of the fabric (as opposed to, for example, being attached to an integrated fabric structure). The fabric may be produced by any suitable technique such as weaving, knitting, braiding or tufting.

The fabric may be, or comprise part of, an item of clothing. In this way, physical movement of a wearer of the item of clothing could be monitored and measured. The item of clothing could be used for the control of remote equipment, or in conjunction with interactive games or virtual reality software. Alternatively, the items of clothing could be used for sports science or medical purposes in order to analyse the bodily movements of people or animals. In a preferred embodiment, the item of clothing is a glove, although other items of clothing, such as a body suit, trousers or leggings, shoes, t-shirts, shirts or other garments for the upper or lower body, are possible.

According to a fifth aspect of the invention there is provided a detection system including:

at least one composite fibre including at least a first and a second component, wherein at least one of the components is an optical fibre, and the components are intertwined;

means for directing electromagnetic radiation along the optical fibre; and detection means for detecting electromagnetic radiation emanating from the optical fibre.

The detection system may further include analysis means for deriving a physical variable that perturbs the at least one composite fibre, or a variation therein, from the electromagnetic radiation detected by the detection means, or a variation in said electromagnetic radiation. The analysis means may comprise a suitably programmed computer or microprocessor.

In one embodiment, the analysis means derives the strain or compressive load applied to the at least one composite fibre, or a variation therein.

In another embodiment, the analysis means derives the torque applied to the at least one composite fibre, or a variation therein.

Advantageously, the analysis means derives the position at which a force is applied to the at least one composite and/or a conformation adopted by the at least one composite fibre in response to the applied force.

The optical fibre may be a fibre Bragg grating, preferably a chirped fibre Bragg grating.

The detection means may include an optical filter, preferably a narrow bandgap filter. Thin-film coatings may be used to provide the desired filtering properties. An optical filter may be used instead of, or in addition to, a fibre Bragg grating optical fibre.

The detection system may include at least two composite fibres, and the analysis means may be adapted to derive the position at which a force is applied to the composite fibres and/or a conformation adopted by the composite fibres in response to the applied force by comparing the electromagnetic radiation emanating from the optical fibres, or comparing variations in the electromagnetic radiation emanating from the optical fibres. The analysis means may utilise an ab initio calculation to derive these data from the comparison, e.g. taking into account the different path lengths of the optical fibres resulting from the application of the force. Alternatively, artificial intelligence, such as a neural network, may be used to derive the position at which the force is applied and/or the conformation adopted. The analysis means may be adapted to derive the degree of bend, for example a radius of curvature, of the composite fibres.

In further embodiments, the optical fibres of a pair of composite fibres have first ends located in one region and second ends located in another region spaced apart from the first ends, and the means for directing electromagnetic radiation directs electromagnetic radiation into the optical fibre of one composite fibre in the pair at the first end thereof, and directs electromagnetic radiation into the optical fibre of the other composite fibre in the pair at the second end thereof so that electromagnetic radiation in one composite fibre travels in an opposite direction to electromagnetic radiation in the other composite fibre in the pair. In a particularly preferred embodiment, the pair of composite fibres are substantially parallel, and electromagnetic radiation is directed into the optical fibres from opposite ends. In this way, the position at which a force is applied and/or a conformation adopted may be derived by comparing the chirp of the optical fibres in the pair of composite fibres.

According to a sixth aspect of the invention there is provided a method of detecting a physical variable including the steps of:

providing at least one composite fibre including at least a first and a second component, wherein the first component is an optical fibre, and the components are intertwined;

directing electromagnetic radiation along the optical fibre;

detecting electromagnetic radiation emanating from the optical fibre; and deriving a physical variable that perturbs the at least one composite fibre, or a variation therein, from the detected electromagnetic radiation or a variation in said detected electromagnetic radiation.

BRIEF DESCRIPTION OF THE FIGURES

Embodiments of composite fibres and detection systems in accordance with the invention will now be described with reference to the accompanying drawings, in which:—

DETAILED DESCRIPTION OF THE INVENTION

Figure 1:
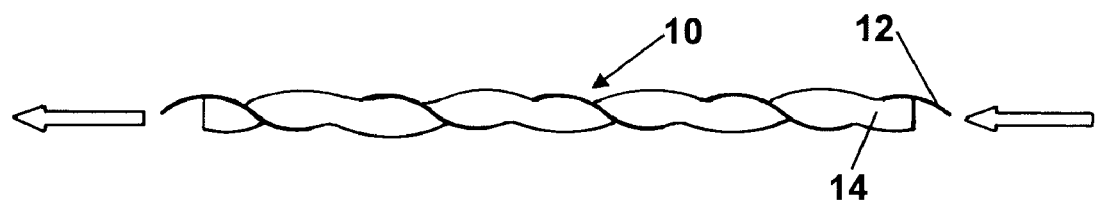
FIG. 1 shows a fibre of the invention under low or no longitudinal strain.
Figure 2:
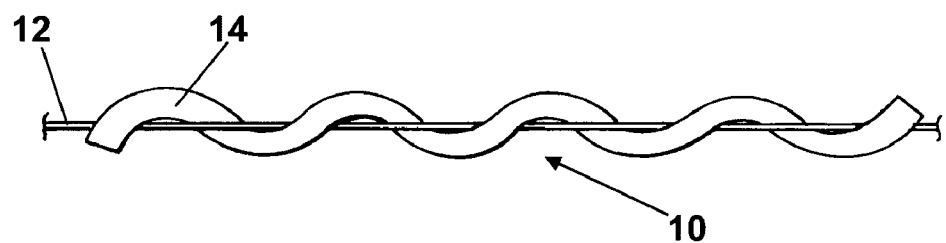
FIG. 2 shows the fibre of FIG. 1 under a longitudinal strain.

FIG. 1 shows a helically wound fibre 10 of the invention which comprises a first component 12 and a second component 14. The first component 12 is an optical fibre, which is wound around the periphery of the second component 14 forming a helix. The first component is provided around the second component through one or more turns, the one or more turns being spaced longitudinally relative to an axis defined by the second component. Typically, as shown in FIG. 1, the wrapping of the first component 12 around the second component 14 causes a deformation of the second component 14 from a generally linear configuration to a helical configuration. FIG. 2 shows a conformation adopted by the helically wound fibre 10 when subjected to a longitudinal strain. It can be seen that the effective diameter of the fibre 10 increases when a tensile load is applied, this being indicative of a negative Poisson's ratio. Such behaviour is auxetic in nature, and one consequence is that the application of strain to the fibre 10 results in a relatively large perturbation to the path described by the optical fibre 12. The present inventor has found that, highly advantageously, strain applied to a fibre of the type depicted in FIGS. 1 and 2 causes relatively large variations in the transmission of light through the optical fibre. Without wishing to be limited by any particular theory, it is believed that relatively large variations in light transmission are caused by changes in the bend radii inherent in a helical geometry. Optical fibres are conventionally designed to achieve maximal internal reflection; this internal reflection is diminished when the fibre is deformed or curved. Conventionally, in applications such as long distance communications, this is not a problem because tight bends can be avoided. The present inventor has realised that when an optical fibre is bent beyond a certain curvature, light losses increase dramatically. Again, without wishing to be limited by any particular theory it is postulated that the present invention can provide sensitive sensors by placing optical fibres in positions which exploit this phenomenon.

In the example shown in FIGS. 1 and 2, where the first component 12 is an optical fibre, the application of positive longitudinal strain causes the first component 12 to become less deformed, and thus light transmission increases with increasing strain. It should be noted that these advantageous features are not solely restricted to auxetic fibres, and helically wound fibres which are not auxetic in nature can also display the relative large variations in light transmission. Thus, the present invention embraces non-auxetic, helically wound fibres.

It is also possible to utilise a fibre in which the second component is an optical fibre. In such embodiments, the application of positive longitudinal strain causes the second component to adopt a more deformed confirmation, thereby producing a decrease in light transmission as the applied strain increases. In either scenario, the non-optical fibre component (whether this is the first component 12 or the second component 14) may be constructed from an elastomeric or plastic material. It is also possible to utilise fibres in which both the first component 12 and second component 14 are optical fibres. Irrespective of which component is an optical fibre, there should be a difference in the modulus of elasticity of the components, so that the application of a longitudinal strain causes helical deformation of the components. Further details concerning the fundamental principles of helically wrapped auxetic fibres can be found in WO 2006/021763 and WO 2004/088015.

Figure 3:
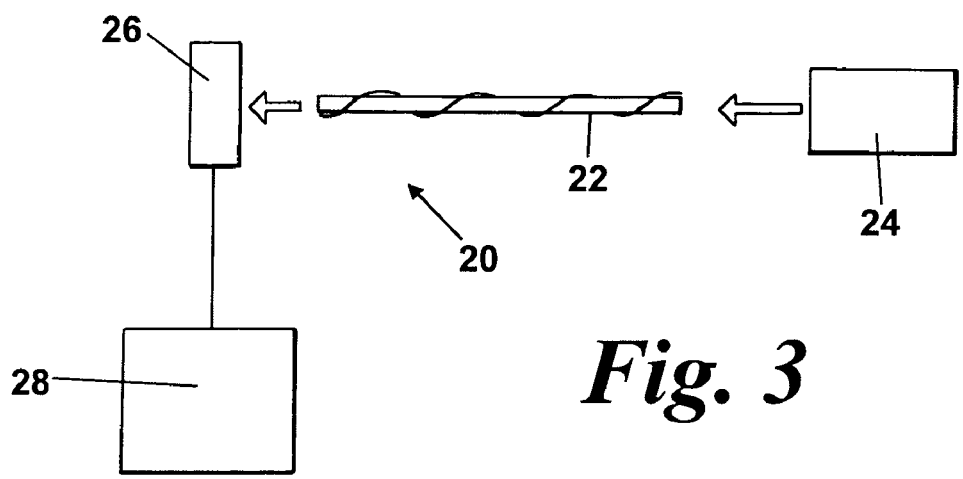
FIG. 3 is a partially schematic drawing of a detection system.

FIG. 3 shows a detection system, depicted generally at 20, which incorporates a fibre 22 of the invention. The detection system 20 further comprises a light source 24, for directing light into one end of the optical fibre contained in the fibre 22. The light source 24 can be of any suitable type, such as a laser or LED, and light of any suitable wavelength or range of wavelengths might be utilised, such as ultraviolet, visible or infrared radiation. A suitable detector 26 such as a light-to-voltage sensor is positioned adjacent the other end of the optical fibre, and detects light transmitted along the optical fibre. The output of the detector 26 is monitored by analysis means 28, which is calibrated or otherwise adapted to equate the measured light transmission with a perturbation to the fibre 22, such as an increase or decrease in an applied longitudinal strain.

In another aspect of the invention, it has been found that the application of torque to a fibre of the invention produces a measurable change in light transmission through the optical fibre. Thus, the present invention can be used as a torque sensor. Furthermore, it should be noted that, in addition to determining the magnitude of the applied torque, it is also possible to deduce the direction in which torque is applied from the sign of the change in light intensity. Physically, it is believed (again, without wishing to be bound by any theory) that this is due to the changes in path length and angle produced when torque is applied—the winding of the components in the fibre becomes tighter when torque is applied in one direction and less tight when torque is applied in the opposite direction. In one set of experiments torque was applied manually to a fibre of the invention consisting of a 1000 µm Super Eska® communications optical fibre helically wrapped around a core elastomer (8 mm "bungee" cord). A red (650 nm) LED was used as a light source to introduce light into the optical fibre. Light emanating from the other end of the optical fibre was detected with a fibre optic test set manufactured by Industrial Fibre Optics. It is common for the core fibre to be significantly bigger than the other fibre. In other representative examples the diameter of the optical fibre is around 250 microns and the diameter of the core is 1 mm or more.

Figure 4:
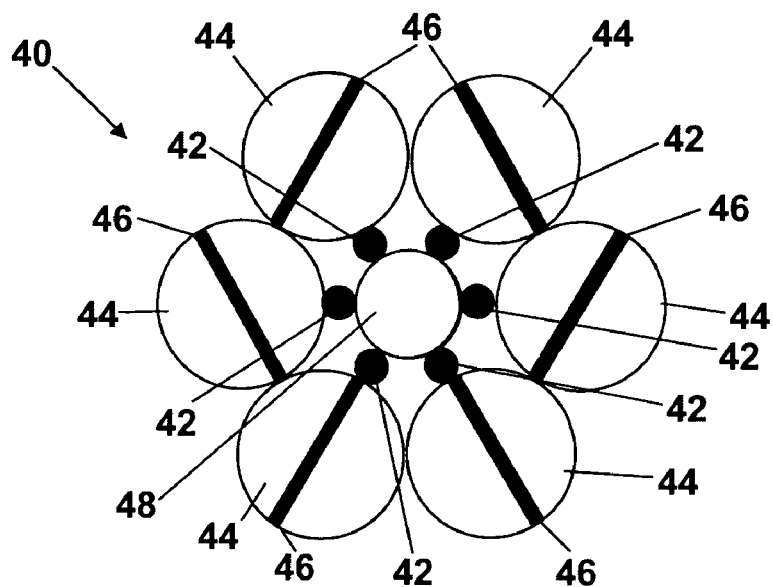
FIG. 4 is an end view of a bundle of fibres.

A plurality of fibres of the invention which incorporate optical fibres may be combined into a more complex structure. In the simplest of these structures, a pair of fibres are disposed alongside each other in a substantially parallel configuration. The fibres may or may not be spaced apart by a core component. FIG. 4 shows a bundle structure 40 which comprises a plurality of auxetic fibres of the invention circumferentially arranged around a central axis. Each fibre comprises a first component 42 and a second component 44. The stripes 46 shown in FIG. 4 indicate the direction of wrapping of the first component 42 around the second component 44, i.e., the handiness of the fibre. Preferably, adjacent fibres in the bundle are wrapped in opposite directions. In the embodiments shown in FIG. 4, the fibres are arranged peripherally around a core component 48, although it is also possible to utilise embodiments in which there is no core component.

Figure 5:
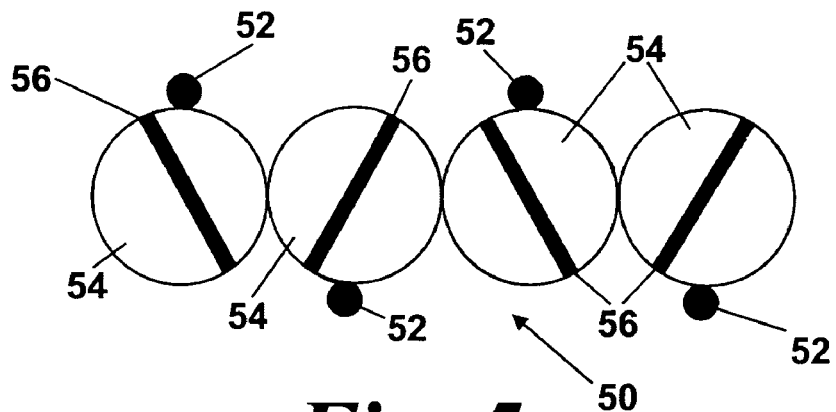
FIG. 5 is an end view of a tape of fibres.

FIG. 4 shows another complex structure 50 in the form of a flat "tape" comprising a plurality of fibres of the invention arranged alongside each other in a planar configuration. Each fibre comprises a first component 52 and a second component 54. The stripes 56 shown in FIG. 5 indicate the wrapping direction in the same manner as the stripes 46 shown in FIG. 4, and similar comments concerning adjacent fibres apply. It is also possible to utilise large numbers of substantially parallel fibres in order to produce a sheet-like structure.

Fibres and/or more complex structures of the invention can be incorporated into larger structures in a number of ways. A fabric can be produced utilising fibres of the present invention as yarns. Fabric production techniques such as weaving, knitting or braiding might be utilised for this purpose. In another embodiment, a composite material is made by incorporating fibres and/or more complex structures in the lay-up process, followed by the Introduction of a resin thereto. The resin is subsequently cured to produce the composite material. For example, fibres of the invention can be incorporated into mats of carbon fibre (or other high strength fibres) or laid in between mats of carbon fibre, which are subsequently treated with a resin which is cured to produce the composite material. Such structures have numerous applications, such as in the production of aircraft wings. It is highly advantageous to have sensors which can provide structural information incorporated in the structural material. A further advantage is that information can be obtained from the optical fibre sensors during the curing of the resin, thereby providing information as to whether the curing process has been completed satisfactorily. Other application areas for embedded fibres of the invention include other aircraft components, such as the fuselage, bridges and buildings. The fibres could then remain in place throughout the lifetime of the structure, enabling structural health to be monitored.

Figure 6:
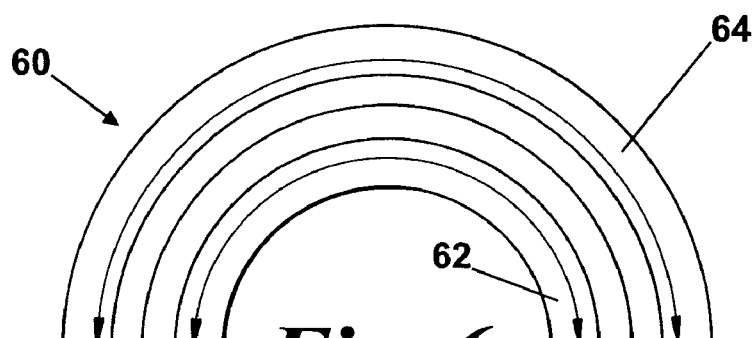
FIG. 6 shows a tape of fibres when subjected to a bending force.

The present invention can be used to determine the position at which a physical perturbation to the fibre occurs and/or the confirmation adopted by the structure in response to an applied force. FIG. 6 shows an example in which a flat "tape" 60 of fibres of the invention is bent so as to adopt the configuration of an arc. The radius of curvature of an fibre 62 disposed on the inside of the arc is less than the radius of curvature of an fibre 64 disposed on the outside of the arc. Therefore, when the tape 60 is subjected to a bending force causing the tape 60 to adopt the arc configuration shown in FIG. 6, the outer fibre 64 has a longer path length than the path length of the inner fibre 62. This is manifest in differing helical wrapping configurations of the optical fibres in the inner and outer fibres 62, 64. By measuring the variations in light transmission through the optical fibres of the fibres in the tape 60, it is possible to determine the extent to which the tape 60 is bent. This can be done from first principles using a suitably programmed computer to perform the calculations. Other techniques might be employed in order to determine position sensitive data, i.e. where physical perturbations have occurred along the length of a fibre. For example, fibre Bragg gratings may be used for this purpose. Chirped fibre Bragg gratings might be used in which the Bragg wavelength varies with position. Thus, a perturbation applied to the fibre Bragg grating at a given position will principally affect the Bragg grating present at this position, which can be identified by the detection system from the characteristic Bragg wavelength. The perturbation to the system may be manifest in a variation in the Bragg wavelength of the Bragg grating at or near to the position of the perturbation. It should be appreciated from this that the detection technique employed in the present invention may not simply comprise a measurement of variation in transmitted light intensity. Other properties of the light directed into the optical fibre, such as the wavelength distribution of light emerging from the optical fibre might be detected. For example, variations in the Bragg wavelength of one or more Bragg gratings formed in the optical fibre might be detected.

Figure 7A:
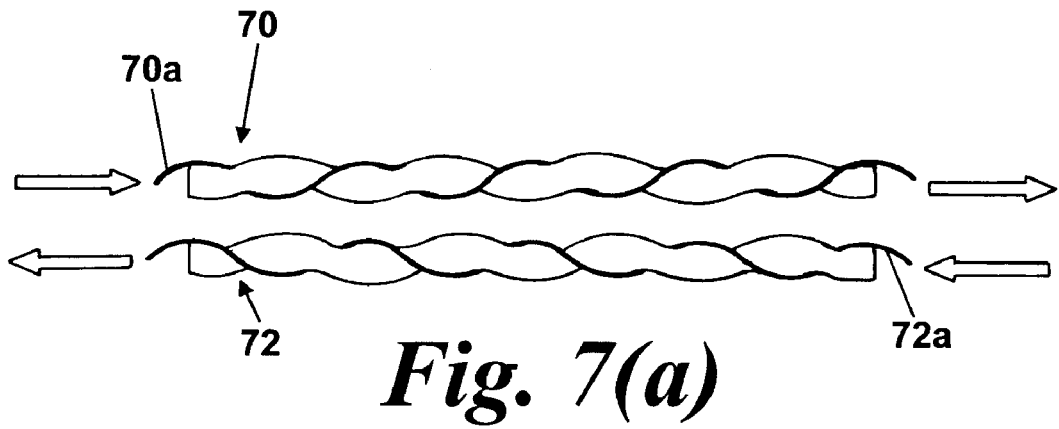
FIG. 7 shows (a) parallel arrangements of two fibres in which light is transmitted along the fibres in opposite directions and (b) shows chirp values along the fibres as a function of fibre length.
Figure 7B:
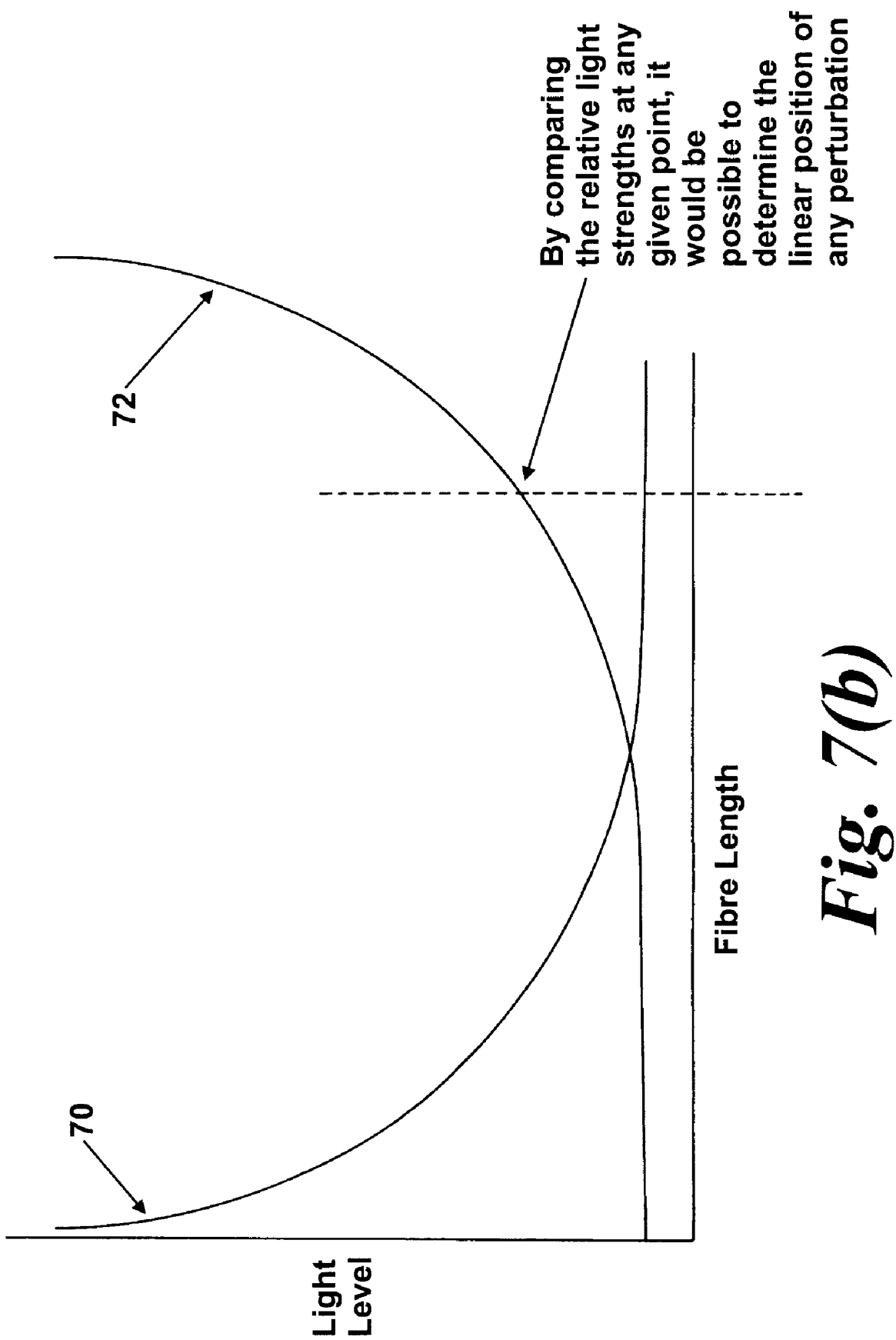

FIG. 7 shows a further embodiment in which the position of a perturbation is determined. As shown in FIG. 7a, a pair of parallel fibres 70, 72 are employed, and a light source or sources are utilised so as to direct light into the optical fibre 70a of fibre 70 from one direction and to introduce light into the optical fibre 72a of fibre 72 from the opposite direction. Thus, light travels along the optical fibres 70a, 72a in an essentially anti-parallel fashion, and emerges from opposite ends of the optical fibres 70a, 72a to be detected by suitable detection means. Owing to the substantially anti-parallel directions of light travel through the optical fibres, the application of a perturbing force along the lengths of the fibres produces different chirps (drop-offs in light transmission) as a function of position. Variations in transmitted light levels for the auxetic fibre 70, 72 as a function of the position along the fibres at which a perturbation is made is shown in FIG. 7b. By comparing the chirps measured for each fibre utilising the information displayed in FIG. 7b, it is possible to determine where a perturbation has occurred.

Figure 8:
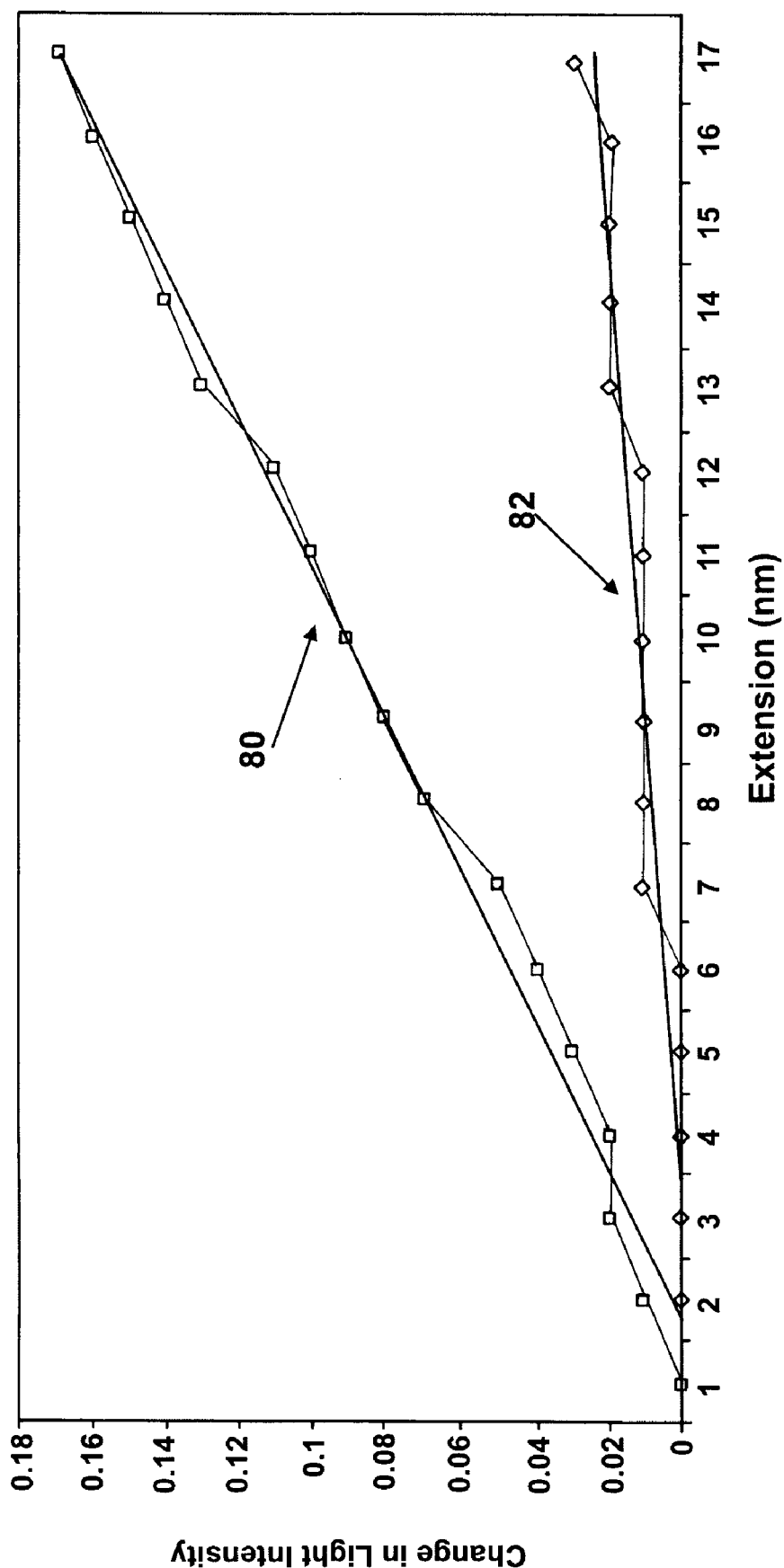
FIG. 8 shows light transmission through helically wound and linear optical fibres.

Experiments were performed measuring light transmission through helically wrapped and unwrapped (essentially linear) polyurethane monofilaments. Changes in transmitted light intensity were measured as a function of applied longitudinal strain, and the results are shown in FIG. 8. The measured changes in transmitted light intensity for the helically wound optical fibre of the invention are shown generally at 80, and the changes in transmitted light intensity measured for the unwound optical fibre are shown generally at 82. It can be seen that very substantial enhancements to the detection of sensitivity (ca. 600%) are associated with the helically wrapped device of the invention.

Many variations to the principles described above would readily suggest themselves to the skilled person. For example, it is not essential that light transmission through the optical fibre is measured. Detection of variations in the wavelength distribution of the transmitted light might be detected. In a further alternative, temporal characteristics of the transmitted light might be monitored. For example, the light directed into the optical fibre might be pulsed, and characteristics of the optical path length determined by measuring delays, such as in the so called "sing-around method". Interferometry might be employed. In systems utilising a plurality of fibres, it is possible to utilise fibres that are tailored to sense different physical variables. For example, in an aerospace environment, it is may be desirable to utilise fibres suitable to detect engine vibration, and other fibres selected to measure structural loadings. It is possible to use light of different characteristics, such as differing wavelengths and/or intensities, to interrogate different fibres. Similarly, when fibres which comprise two optical fibres are utilised, it is possible to detect different physical variables with the optical fibres. Again, different measurement techniques and light having different physical characteristics might be utilised to interrogate each optical fibre.

The invention claimed is:

1. A composite fibre including at least a first and second component, wherein at least one of the components is an optical fibre that transmits light therethrough by internal reflection, wherein the first component is wound around the second component, and optionally the second component is wound around the first component; and in which the composite fibre is auxetic, and wherein there is a difference in the modulus of elasticity of the first component and the second component such that an application of a longitudinal strain causes helical deformation of said first and second components.

2. A composite fibre according to claim 1 in which the modulus of elasticity of the first component is greater than the modulus of elasticity of the second component.

3. A composite material having embedded therein at least one composite fibre according to claim 2.

4. A fabric including at least one composite fibre according to claim 2.

5. A composite fibre according to claim 2 in which the optical fibre is a polymer optical fibre or a silica optical fibre.

6. A composite material having embedded therein at least one composite fibre according to claim 1.

7. A fabric including at least one composite fibre according to claim 1.

8. A fibrous assembly consisting essentially of a pair of the composite fibres of claim 1 disposed alongside one another.

9. A composite material having embedded therein at least one fibrous assembly according to claim 8.

10. A fabric including at least one fibrous assembly according to claim 8.

11. A fibrous assembly including three or more of the composite fibres of claim 1 arranged alongside each other so as to form a sheet-like assembly.

12. A composite material having embedded therein at least one fibrous assembly according to claim 11.

13. A fabric including at least one fibrous assembly according to claim 11.

14. A composite fibre according to claim 1 in which the optical fibre is a polymer optical fibre or a silica optical fibre.

* * * * *